3,159,654
NEW SERIES OF CARBOXYLIC ACID ESTERS OF 5-NITRO-2-FURYL ALKYLIDENE HYDROXY-ALKYL SEMICARBAZONES
William C. Ward, Norwich, N.Y., assignor to The Norwich Pharmacal Company, Norwich, N.Y., a corporation of New York
No Drawing. Filed Sept. 25, 1958, Ser. No. 763,176
6 Claims. (Cl. 260—347.4)

This invention relates to a new series of chemical compounds which exhibit a high order of in vivo chemotherapeutic effectiveness against microbial infactions upon oral administration in far less than toxic amounts and which are well tolerated by the host when so administered. The series consists of a number of closely related carboxylic acid esters of 5-nitro-2-furyl alkylidene hydroxyalkyl semicarbazones. They are represented by the formula:

$$O_2N-\underset{O}{\underset{|}{\bigcirc}}-(CH=CH)_n CH=N-\underset{|}{N}-CO-NHR_1$$
$$\qquad\qquad\qquad\qquad\qquad\qquad R$$

wherein $n$ represents an integer from 0–1; and R and $R_1$ represent dissimilar groups selected from the class consisting of hydrogen and (lower)alkanoyloxy(lower)alkyl.

I have discovered that when members of my new series are administered per os in sub-toxic doses to various species of animals lethally infected with a variety of microorganisms a surprising reduction in mortality is achieved. Exemplarly of the results obtained with members of my series in the treatment of fatal infections of animals are the following:

A. Trypanosome infections: Mice lethally infected with *Trypanosoma cruzi* or *Trypanosoma gambiense*, forms of trypanosomes causative of sleeping sickness, were protected against that disease when administered b.i.d. a dose of 140 mg./kg. per os over a period of from two to five days.

B. Penicillin resistant bacterial infections: Mice lethally infected with a penicillin resistant strain of *Micrococcus pyogenes* var. *aureus* were protected from death by the administration per os of members of my series. By a single dose of 105 mg./kg. administered one-half hour post infection, 100% were protected. By a divided dose regimen of 35 mg./kg. administered one-half, four and eight hours post infection, 50% survived. Control animals receiving no medication suffered mortality of from 90–95%.

C. Coccidiosis: Chickens highly infected with about 500,000 sporulated oocysts of *Eimeria tenella*, an infective dose causing morbidity and resulting in 50% mortality, were successfully protected against the ravages of disease produced by that organism. A very small dose of 15 mg./kg. b.i.d. per os for four days caused a 90% survival with no evidence of effects of the disease.

D. Salmonellosis: Mice lethally infacted with *Salmonella typhosa* were protected by a total dose of 580 mg./kg. administered per os in increments of 280–140–140 at one-half, 12 and 24 hours post infection. In the treated animals, 70% survived while in untreated animals, 95% died.

I have further discovered that the members of my new series possesses a desirable and valuable depot action releasing, over a considerable time period, as a result of hydrolysis, 5-nitro-2-furyl alkylidene hydroxyalkyl semicarbazones which are known to be valuable chemotherapeutic agents.

Another advantage in the use of my series is the absence of unwanted effects, for instance, emesis, sometimes provoked upon per os administration of the hydrolytic products. In dogs, for instance, the hydrolytic products in a dose of 50 mg./kg. provoke vomiting of the order of at least 50%; while less than half that number are so affected by an equivalent dose of members of my series.

The members of my series are relatively non-toxic. The $LD_{50}$ in mice is about 580 mg/kg. Dogs and chickens have evidenced no toxic manifestations attendant upon their use in chemotherapeutically effective quantities.

While each of the members of my new series exhibits in vivo chemotherapeutic effectiveness against microbial infections upon oral administration, they vary from one another somewhat in degree of effectiveness. The member of my new series that I now prefer is 5-nitro-2-furaldehyde 2-(2-acetoxyethyl) semicarbazone.

The method which I now prefer to follow in the preparation of the members of my series consists in treating a 5-nitro-2-furyl alkylidene hydroxylalkyl semicarbazone with an acid anhydride. The reaction is preferably hastened by supplying heat to the mixture. Other methods useful for preparing esters such as the Fischer-Speier and Schotten-Baumann reactions can be employed.

The members of my series may be readily compounded in suitable and acceptable pharmaceutical dosage forms employing conventional excipients. They may be administered to domestic animals through incorporation in the feed supply or drinking water.

In order that my invention may be readily available to those skilled in the art, the following examples are briefly described:

EXAMPLE 1

*5-Nitro-2-Furaldehyde 2-(2-Acetoxyethyl) Semicarbazone*

To 5 grams of 5-nitro-2-furaldehyde 2-(2-hydroxyethyl) semicarbazone is added 35 cc. of acetic anhydride. This mixture is heated at steam bath temperature for three hours. Solution of the solid nitrofuran is obtained in the acetic anhydride in this time period. Upon cooling, crystals are deposited. These are filtered and recrystallized from ethanol. The yield is 4.1 grams or 71%; M.P. 177–178° C. with decomposition.

EXAMPLE 2

*5-Nitro-2-Furaldehyde 2-(2-Butyryloxyethyl) Semicarbazone*

To 5 grams of 5-nitro-2-furaldehyde 2-(2-hydroxyethyl) semicarbazone is added 40 cc. of butyric anhydride. This mixture is heated at steam bath temperature for eight hours. A small amount of undissolved solid is filtered at this point and then the filtrate concentrated to approximately one-half of its initial volume. This is cooled and a solid crystallizes therefrom. The solid is filtered and recrystallized from ethanol. The yield is 4.8 grams or 72%; M.P. 126–127° C. with decomposition.

EXAMPLE 3

*5-Nitro-2-Furaldehyde 2-(2-Acetoxypropyl) Semicarbazone*

To 2.5 grams of 5-nitro-2-furaldehyde 2-(2-hydroxypropyl) semicarbazone is added 20 cc. of acetic anhydride. This mixture is heated at steam bath temperature for four hours. At the end of this period the solution is cooled and a solid is deposited. The solid is filtered and recrystallized from dilute acetic acid. The yield is 1.8 grams or 63.5%; M.P. 173–175° C. with decomposition.

EXAMPLE 4

*β-(5-Nitro-2-Furyl) Acrolein 2-(2-Acetoxyethyl) Semicarbazone*

To 2.5 grams of 5-nitro-2-furylacrolein 2-(2-hydroxyethyl) semicarbazone is added 18 cc. of acetic anhydride. The mixture is heated at steam bath temperature for four hours. At the end of this time the solution is cooled and water added whereupon a solid is deposited. It is filtered and recrystallized from dilute acetic acid. The yield is 1.7 grams or 59%; M.P. 179–182° C. with decomposition.

EXAMPLE 5

5-Nitro-2-Furaldehyde 2-(4-Acetoxybutyl) Semicarbazone

Fifty-five grams (0.528 mole) 4-hydrazino-1-butanol (B.P. 114–115° C./2 mm.) is mixed with 200 ml. of water, and the pH is adjusted to 7 with dilute acid. In the resulting clear solution is dissolved 54 g. (0.660 mole) of potassium cyanate. The stirred solution is maintained at pH 5.5 to 7.5 for approximately one and one-half hours by adding acid as needed, and is maintained at 25–30° C. by cooling with an ice-water bath as needed. To the clear solution of 2-(4-hydroxybutyl) semicarbazide hydrochloride is added slowly with stirring a solution of 70 g. (0.5 mole) 5-nitro-2-furaldehyde in alcohol. The precipitate is filtered and washed with alcohol. The yield of 5-nitro-2-furaldehyde 2-(4-hydroxybutyl) semicarbazone is 66 g., M.P. 157.5–158° C. with decomposition.

Five and four-tenths grams (0.02 mole) 5-nitro-2-furaldehyde 2-(hydroxybutyl) semicarbazone is dissolved in 51 g. (0.50 mole) of acetic anhydride by heating the mixture on the steam bath for eight hours. The red-orange solution which results is cooled in an ice-water bath for two hours to precipitate the ester. The precipitate is filtered, washed well with water and with alcohol, and dried in a 60° C. oven. The yield of 5-nitro-2-furaldehyde 2-(4-acetoxybutyl) semicarbazone is 5 g. (80% of theory), M.P. 149–150° C. with decomposition.

EXAMPLE 6

5-Nitro-2-Furaldehyde 4-(2-Acetoxyethyl) Semicarbazone

To 5 grams of 5-nitro-2-furaldehyde 4-(2-hydroxyethyl) semicarbazone is added 30 cc. of acetic anhydride. The mixture is heated at steam bath temperature for five hours. A small amount of undissolved solid is filtered at the end of this time period and water is added to the filtrate whereupon a solid is deposited. It is filtered and recrystallized from dilute acetic acid. Yield 3.2 grams or 55%; M.P. 159–161° C. with decomposition.

What I claim is:

1. A carboxylic acid ester of a 5-nitro-2-furyl alkylidene hydroxyalkyl semicarbazone represented by the formula:

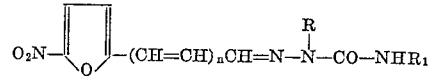

wherein $n$ represents an integer from 0–1, and

R and $R_1$ represent dissimilar groups selected from the class consisting of hydrogen and (lower)alkonoyloxy(lower)alkyl.

2. 5-nitro-2-furaldehyde 2-(2-acetoxyethyl) semicarbazone.

3. 5-nitro-2-furaldehyde 2-(2-butyryloxyethyl) semicarbazone.

4. β-(5-nitro-2-furyl) acrolein 2-(2-acetoxyethyl) semicarbazone.

5. 5-nitro-2-furaldehyde 2-(4-acetoxybutyl) semicarbazone.

6. 5-nitro-2-furaldehyde 4-(2-acetoxyethyl) semicarbazone.

References Cited by the Examiner

UNITED STATES PATENTS

| | | | |
|---|---|---|---|
| 2,416,234 | 2/49 | Stillman | 260—347.3 |
| 2,656,350 | 10/53 | Ward | 260—347.3 |

OTHER REFERENCES

Hayes et al.: J. Amer. Chem. Soc., vol. 77 (1955), page 2282.

Cheronis et al.: Semi-micro Qualitative Analysis, Crowell Publishing Company, New York (1947), pp. 179–180.

IRVING MARCUS, *Primary Examiner*.

J. LIDOFF, *Examiner*.